(12) United States Patent
Narasayya et al.

(10) Patent No.: US 9,311,376 B2
(45) Date of Patent: Apr. 12, 2016

(54) PERFORMANCE SERVICE LEVEL AGREEMENTS IN MULTI-TENANT DATABASE SYSTEMS

(75) Inventors: Vivek Ravindranath Narasayya, Redmond, WA (US); Feng Li, Singapore (SG); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 13/461,785

(22) Filed: May 2, 2012

(65) Prior Publication Data

US 2013/0297655 A1 Nov. 7, 2013

(51) Int. Cl.
*G06F 17/30* (2006.01)
*H04L 12/24* (2006.01)
*G06F 11/34* (2006.01)

(52) U.S. Cl.
CPC ...... *G06F 17/30575* (2013.01); *G06F 11/3457* (2013.01); *H04L 41/5003* (2013.01); *H04L 41/5009* (2013.01)

(58) Field of Classification Search
CPC ............ H04L 41/5003; H04L 41/5009; G06F 11/3457; G06F 17/30575
USPC .................................. 707/791; 702/182, 186
See application file for complete search history.

(56) References Cited

U.S. PATENT DOCUMENTS

| | | | |
|---|---|---|---|
| 2002/0095400 A1 | 7/2002 | Johnson et al. | |
| 2003/0187970 A1* | 10/2003 | Chase et al. | 709/223 |
| 2003/0229760 A1* | 12/2003 | Doyle et al. | 711/134 |
| 2006/0074970 A1* | 4/2006 | Narayanan et al. | 707/102 |
| 2006/0161883 A1* | 7/2006 | Lubrecht | G06Q 10/06 717/104 |
| 2008/0046266 A1* | 2/2008 | Gudipalley et al. | 705/1 |
| 2008/0228755 A1* | 9/2008 | Haga | G06F 11/008 |
| 2009/0018813 A1* | 1/2009 | Kothari | G06Q 10/04 703/22 |
| 2010/0114531 A1* | 5/2010 | Korn et al. | 702/186 |
| 2010/0125612 A1 | 5/2010 | Amradkar et al. | |
| 2010/0138830 A1 | 6/2010 | Astete et al. | |
| 2010/0325281 A1 | 12/2010 | Li et al. | |

(Continued)

OTHER PUBLICATIONS

Cheng, et al., "A Multi-Tenant Oriented Performance Monitoring, Detecting and Scheduling Architecture Based on SLA", Retrieved at <<http://ieeexplore.ieee.org/stamp/stamp.jsp?tp=&arnumber=5420114>>, Joint Conferences on Pervasive Computing (JCPC), Dec. 3, 2009, pp. 599-604.

(Continued)

*Primary Examiner* — Jensen Hu
(74) *Attorney, Agent, or Firm* — Sandy Swain; Micky Minhas

(57) ABSTRACT

Various technologies described herein pertain to evaluating service provider compliance with terms of a performance service level agreement (SLA) for a tenant in a multi-tenant database system. The terms of the performance SLA can set a performance criterion as though a level of a resource of hardware of the multi-tenant database system is dedicated to the tenant. An actual performance metric of the resource can be tracked for a workload of the tenant. Further, a baseline performance metric of the resource can be determined for the workload of the tenant. The baseline performance metric can be based on a simulation as though the level of the resource as set in the performance SLA is dedicated to the workload of the tenant. Moreover, the actual performance metric can be compared with the baseline performance metric to evaluate compliance with the performance SLA.

20 Claims, 9 Drawing Sheets

(56) References Cited

U.S. PATENT DOCUMENTS

| | | | |
|---|---|---|---|
| 2011/0126168 | A1 | 5/2011 | Ilyayev |
| 2011/0131309 | A1 | 6/2011 | Akiyama et al. |
| 2011/0138034 | A1 | 6/2011 | Brookbanks et al. |
| 2012/0254269 | A1* | 10/2012 | Carmichael .................. 707/827 |
| 2012/0259962 | A1* | 10/2012 | Bose ....................... H04L 41/50 709/223 |

OTHER PUBLICATIONS

Aho, et al., "Principles of Optimal Page Replacement", Retrieved at <<http://homes.dcc.ufba.br/~ihtraum/index.html/sistemas_operacionais/articlesMemory/p80-aho.pdf>>, Journal of the Association for Computing Machinery, vol. 18, No. 01, Jan. 1971, pp. 80-93.

"Amazon CloudWatch", Retrieved at <<http://aws.amazon.com/cloudwatch>>, 2011, pp. 1-6.

"Amazon Relational Database Service (RDS)", Retrieved at <<http://aws.amazon.com/rds>>, 2011, pp. 1-20.

Bansal, et al., "CAR: Clock with Adaptive Replacement", Retrieved at <<http://www.cse.iitd.ernet.in/~sbansal/pubs/fast04.pdf>>, USENIX File & Storage Technologies Conference (FAST), 2004, pp. 1-14.

Chou, et al., "An Evaluation of Buffer Management Strategies for Relational Database Systems", Retrieved at <<http://citeseerx.ist.psu.edu/viewdoc/download?doi=10.1.1.71.5419&rep=rep1&type=pdf>>, In Proceeding of the ACM SIGMOD, 1985, pp. 1-15.

Corbató, F.J., et al., "A Paging Experiment with the Multics System", Retrieved at <<http://www.multicians.org/paging-experiment.pdf>>, In Honor of P.M. Morse, MIT Press, 1969, pp. 217-228.

Curino, et al., "Relational Cloud: A Database-as-a-Service for the Cloud", Retrieved at <<http://nms.csail.mit.edu/papers/relcloud_cidr11.pdf>>, CIDR, 2011, pp. 235-240.

"Database.com", Retrieved at <<http://www.database.com/>>, Retrieved Date: Feb. 13, 2012, pp. 1-5.

"DB2 Workload Manager for Linux, Unix and Windows", Retrieved at <<http://www.redbooks.ibm.com/redpieces/abstracts/sg247524.html>>, 2008, pp. 1-372.

Decandia, et al., "Dynamo: Amazon's Highly Available Key-value Store", Retrieved at <<http://www.allthingsdistributed.com/files/amazon-dynamo-sosp2007.pdf>>, In Proceeding of Symposium on Operating Systems Principles (SOSP), 2007, pp. 205-220.

Denning, Peter. J., "The Working Set Model for Program Behavior", Retrieved at <<http://cs.gmu.edu/cne/pjd/PUBS/WSModel_1968.pdf>>, Communications of the ACM, vol. 11, No. 5, May 1968, pp. 323-333.

Duggan, et al., "Performance Prediction for Concurrent Database Workloads", Retrieved at <<http://www.cs.brown.edu/~jennie/research/concurrency.pdf>>, ACM SIGMOD, 2011, pp. 337-348.

"Google Cloud SQL", Retrieved at <<http://code.google.com/apis/sql>>, Retrieved Date: Feb. 13, 2012, p. 1.

Gulati, et al., "mClock: Handling Throughput Variability for Hypervisor IO Scheduling", Retrieved at <<http://www.usenix.org/event/osdi10/tech/full_papers/Gulati.pdf>>, In Proceeding of OSDI, 2010, pp. 1-14.

Johnson, et al., "2Q: A Low Overhead High Performance Buffer Management Replacement Algorithm", Retrieved at <<http://www.vldb.org/conf/1994/P439.PDF>>, In Proceeding of VLDB, 1994, pp. 439-450.

Kao, et al., "An Overview of Real-Time Database Systems", Retrieved at <<http://citeseerx.ist.psu.edu/viewdoc/download-?doi=10.1.1.25.9794&rep=rep1&type=pdf>>, In proceedings of NATO Advanced Study Institute on Real-Time Computing, 1992, pp. 456-479.

Megiddo, et al., "ARC: A Self-Tuning, Low Overhead Replacement Cache", Retrieved at <<http://citeseerx.ist.psu.edu/viewdoc/download?doi=10.1.1.13.5210&rep=rep1&type=pdf>>, USENIX File & Storage Technologies Conference (FAST), 2003, pp. 1-16.

"Microsoft SQL Azure", Retrieved at <<http://www.microsoft.com/windowsazure/sqlazure>>, 2011, pp. 1-6.

O'Neil, et al., "The LRU-K Page Replacement Algorithm for Database Disk Buffering", Retrieved at <<http://citeseerx.ist.psu.edu/viewdoc/download?doi=10.1.1.102.8240&rep=rep1&type=pdf>>, In Proceeding of SIGMOD, 1993, pp. 1-10.

"Oracle Database Cloud Service", Retrieved at <<http://cloud.oracle.com/mycloud/f?p=service:home:0>>, Retrieved Date: Feb. 13, 2012, p. 1.

Stonebraker, Michael, "Operating System Support for Database Management", Retrieved at <<http://www.eecs.umich.edu/~michjc/eecs584/Papers/stonebraker_1981.pdf>>, Communications of the ACM, vol. 24, No. 7, Jul. 1981, pp. 412-418.

"The Role of Memory in VMWare ESX Server 3", Retrieved at <<http://www.vmware.com/pdf/esx3_memory.pdf>>, 2006, pp. 1-11.

Storm, et al., "Adaptive Self-Tuning Memory in DB2", Retrieved at <<http://www.kdug.kr/resource/p1081-storm.pdf>>, In Proceedings of VLDB, 2006, pp. 1081-1092.

"TPC Benchmark H", Retrieved at <<http://www.tpc.org/tpch/spec/tpch2.14.3.pdf>>, 2011, pp. 1-135.

Waldspurger, C. A., "Memory Resource Management in VMware ESX Server", Retrieved at <<http://www.waldspurger.org/carl/papers/esx-mem-osdi02.pdf>>, In Proceeding of Fifth Symposium on Operating Systems Design and Implementation, OSDI, 2002, pp. 1-14.

Wustenhoff, Edward, "Service Level Agreements in the Data Center", Retrieved at <<http://www-it.desy.de/common/documentation/cd-docs/sun/blueprints/0402/sla.pdf>>, Apr. 2002, pp. 1-12.

\* cited by examiner

# PERFORMANCE SERVICE LEVEL AGREEMENTS IN MULTI-TENANT DATABASE SYSTEMS

BACKGROUND

Enterprises today oftentimes rely on relational database systems for efficiently storing, indexing and querying data used by their applications. Recently, several commercial cloud database services have emerged. These services can be viewed as data platforms upon which enterprises can build, tune, and deploy their applications; hence, the cloud database services are typically classified as platform-as-a-service (PaaS). The database service provider is typically responsible for provisioning computing devices, patching, ensuring high availability, and geo-replication. Moreover, the familiar relational paradigm, combined with potential of reduced total cost of ownership, may motivate some enterprises to consider cloud database services as a viable platform for their applications.

The cloud database services, which are typically hosted in data centers that include several computing devices, are oftentimes multi-tenant. Multi-tenancy is used by the service provider to increase consolidation and reduce cost, since dedicating (e.g., reserving) resources up-front for each tenant can be associated with significant expenses. Database service providers typically overcommit resources of their computing devices based on the observation that at any point in time some tenants on the computing device are likely to be much less demanding of resources than others.

An architecture for cloud database services can include a computing device upon which a database server is running. Such computing device can host the data and workload of multiple tenants. Each tenant is allocated a separate logical database, and tenants generally do not share data. In such a multi-tenant database system, resources of the database server are shared by the workloads of tenants assigned to that server. Therefore, when a query workload of one tenant executes on a particular computing device, it consumes resources and can thereby adversely affect the performance of another tenant's queries on the same computing device. This tension between the service provider reducing cost by increasing multi-tenancy, and the desire of tenants for assured performance can slow the transition of enterprise applications to the cloud.

SUMMARY

Described herein are various technologies that pertain to evaluating service provider compliance with terms of a performance service level agreement (SLA) for a tenant in a multi-tenant database system. The terms of the performance SLA can set a performance criterion as though a level of a resource of hardware of the multi-tenant database system is dedicated to the tenant. For example, the level of the resource of the hardware can be a number of IOs per second, a latency for IOs, an amount of CPU utilization, an amount of working memory, an amount of buffer pool memory, or the like. An actual performance metric of the resource can be tracked for a workload of the tenant. Further, a baseline performance metric of the resource can be determined for the workload of the tenant. The baseline performance metric can be based on a simulation as though the level of the resource as set in the performance SLA is dedicated to the workload of the tenant. Moreover, the actual performance metric can be compared with the baseline performance metric to evaluate compliance with the performance SLA.

According to various embodiments, the performance SLA can specify an amount of buffer pool memory, a performance metric type, a predefined duration of time for a time interval at which compliance with the performance SLA is metered, pricing information, and a penalty function. For instance, the amount of the buffer pool memory can be utilized to simulate the baseline performance metric. Further, compliance with the performance SLA can be independently metered during different time intervals set as a function of the predefined duration. Moreover, the penalty function can be utilized to selectively compensate the tenant (e.g., refunding at least a portion of the price paid by the tenant) based upon degradation of performance detected through metering compliance with the performance SLA.

In accordance with various embodiments, resources of the hardware of the multi-tenant database system can be allocated based on performance SLAs. For instance, a page can be selected for eviction from buffer pool memory based on performance SLAs for multiple tenants. The page can be selected for eviction from the buffer pool memory, for example, based on an expected penalty incurred if the page is evicted. The page can also be selected for eviction from the buffer pool memory based on a likelihood of the page being accessed by a workload of a tenant.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
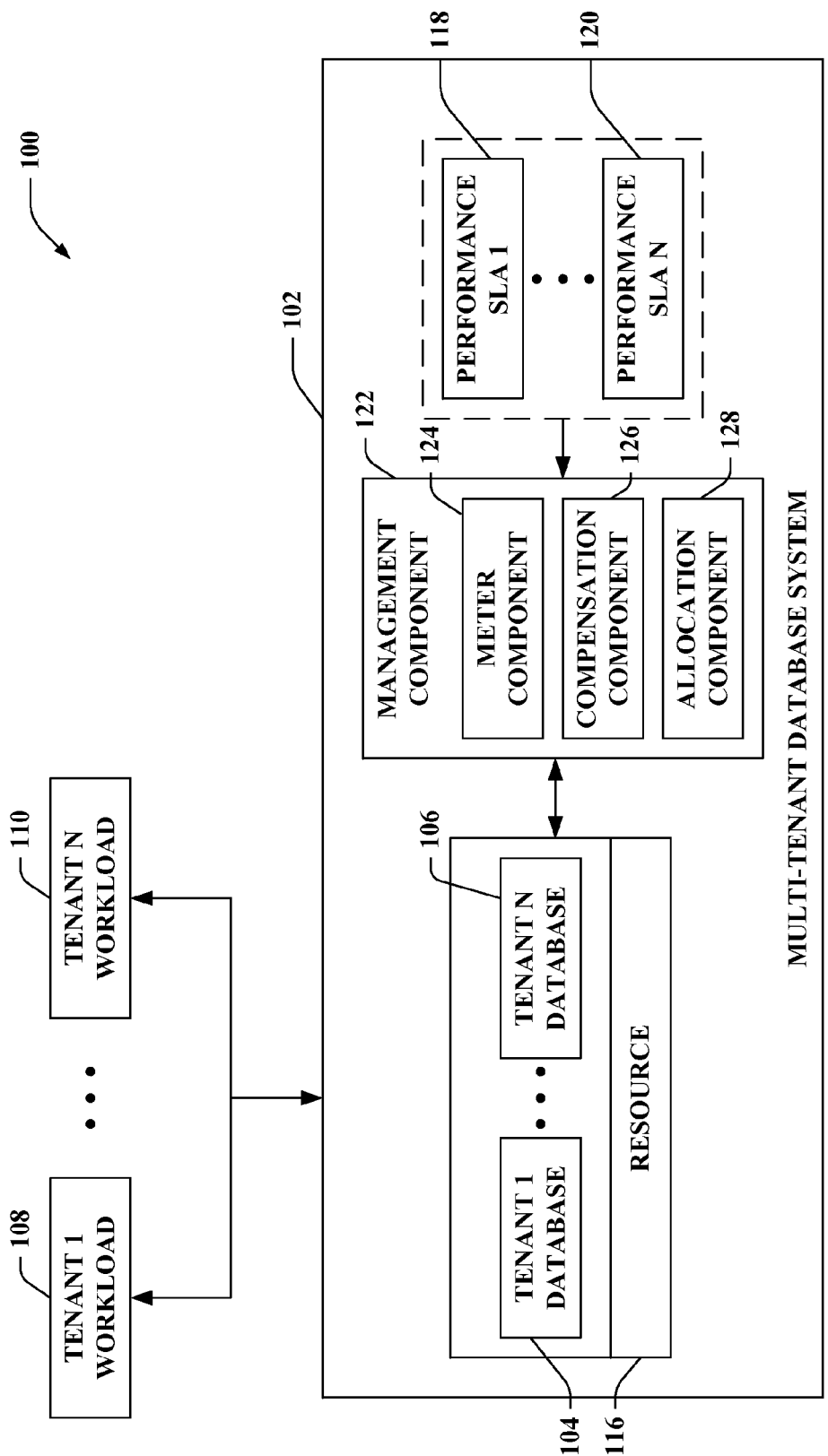
FIG. 1 illustrates a functional block diagram of an exemplary system that employs a performance service level agreement (SLA) for a tenant in a multi-tenant database system.

Various technologies pertaining to using performance service level agreements (SLAs) in a multi-tenant database system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a model for a performance SLA for a multi-tenant database system is provided. Moreover, techniques for efficiently metering whether a service provider complies with a performance SLA for a tenant are described herein. Further, approaches for allocating resource(s) in the presence of performance SLAs are set forth herein.

Enterprises are increasingly looking to leverage cloud database services as a platform on which to run their database applications. Since cloud database services are typically multi-tenant, a workload of a tenant shares resources of the database server with concurrently executing workload(s) of other tenant(s). Therefore, a workload of one tenant can significantly affect the performance of a workload of another tenant. Conventional cloud database services typically do not offer performance SLAs; thus, this lack of offering performance SLAs can be a deterrent for enterprises with performance sensitive applications seeking to use cloud database services. Accordingly, an approach for database service providers to offer meaningful performance SLAs to tenants is provided herein. This approach can be used in the context of a resource (or a plurality of resources) in a multi-tenant database system, where the resource affects performance. For instance, the resource can be buffer pool memory, input/output (IO), working memory, central processing unit (CPU), etc. Various mechanisms and policies set forth herein can enable a database service provider to offer performance SLAs for one or more resources of the multi-tenant database system.

Referring now to the drawings, FIG. 1 illustrates a system 100 that employs a performance service level agreement (SLA) for a tenant in a multi-tenant database system 102. The multi-tenant database system 102 hosts databases and workloads for multiple tenants. As shown, the multi-tenant database system 102 hosts databases and workloads for N tenants, where N can be substantially any integer greater than or equal to two. Hence, in the depicted example, the multi-tenant database system 102 hosts a tenant 1 database 104, . . . , and a tenant N database 106 (collectively referred to as tenant databases 104-106) as well as a tenant 1 workload 108, . . . , and a tenant N workload 110 (collectively referred to as tenant workloads 108-110). According to an example, the tenant 1 database 104, . . . , and the tenant N database 106 can be Structured Query Language (SQL) databases; however, it is to be appreciated that the claimed subject matter is not so limited.

The tenant 1 workload 108 includes queries, manipulations, etc. performed against the tenant 1 database 104. Similarly, the other tenant workload(s) include queries, manipulations, etc. respectively performed against the other tenant database(s). For example, the tenant 1 workload 108 can include a sequence of pages of the tenant 1 database 104 to be accessed, . . . , and the tenant N workload 110 can include a sequence of pages of the tenant N database 106 to be accessed.

Although not shown, it is to be appreciated that a tenant 1 application can use data in the tenant 1 database 104 (e.g., by generating at least a subset of the queries, manipulations, etc. in the tenant 1 workload 108), . . . , and a tenant N application can use data in the tenant N database 106 (e.g., by generating at least a subset of the queries, manipulations, etc. in the tenant N workload 110). The tenant 1 application, . . . , and the tenant N application can be client-side applications.

When executed, the tenant workloads 108-110 consume resources of hardware of the multi-tenant database system 102. The resources consumed when the tenant workloads 108-110 execute include a resource 116. The resource 116 can be, for example, CPU, buffer pool memory, working memory (e.g., for Hash/Sort operators, etc.), IO, and so forth.

The multi-tenant database system 102 can provide cloud database services (e.g., database-as-a-service). For example, cloud database services can offer a database (e.g., SQL database) with a relational programming model and at least a subset of the following other properties: high availability, geo-replicated, scale-out performance, a pay-as-you-go model, and reduced administration overheads. Cloud service providers oftentimes reduce cost by overcommitting resources (e.g., the resource 116, other resource(s), etc.) of hardware of computing devices, which is done by increasing a degree of multi-tenancy on each computing device. Consider an example where the resource 116 is memory. Following this example, a sum of the memory used for executing the tenant workloads 108-110 of the tenants on a computing device can often be more than the physical memory available on the computing device. Such overcommitting of resources can be employed by the service provider since some tenant(s) are likely to be inactive at a given time (e.g., due to tenants being based in different geographic locations, etc.), tenants may place unequal demands on resources (e.g., large databases versus small databases), and so forth.

To address the tension between performance and cost due to overcommitting resources, the multi-tenant database system 102 can employ performance SLAs between the service provider and tenants (e.g., performance SLA 1 118, . . . , and performance SLA N 120, collectively referred to as performance SLAs 118-120). Performance SLAs can hold the service provider accountable for the performance versus cost trade-off Thus, either performance goals identified in the performance SLAs 118-120 are met for the tenants, or alternatively, if such performance goals are unmet, then the service provider compensates the tenants having unmet performance goals (e.g., refunding at least a portion of money paid by the tenants having unmet performance goals). The performance SLAs 118-120 described herein differ from conventional availability SLAs offered by some database service providers. Further, the performance SLAs 118-120 can allow the service provider to offer differentiated pricing according to respective performance needs of the tenants.

Much of the discussion herein pertains to tenant 1, the tenant 1 database 104, the tenant 1 workload 108, and the performance SLA 1 118 (e.g., corresponding to a level of the resource 116 for the tenant 1 workload 108 performed against the tenant 1 database 104). However, it is to be appreciated that these examples can be extended to the other tenants, tenant databases, tenant workloads, tenant applications, and performance SLAs. For instance, the examples set forth herein can be extended to tenant N, the tenant N database 106, the tenant N workload 110, and the performance SLA N 120 (e.g., corresponding to a level of the resource 116 for the tenant N workload 110 performed against the tenant N database 106). According to another example, it is to be appreciated that more than one performance SLA can correspond to a particular tenant workload. Following this example, a first performance SLA can correspond to a level of a first resource for the particular tenant workload and a second performance SLA can correspond to a level of a second resource for the particular tenant workload.

The performance SLA 1 118 includes terms that set a performance criterion (or performance criteria) as though a level of the resource 116 of hardware of the multi-tenant database system 102 is dedicated for tenant 1. Thus, the performance SLA 1 118 uses a generally familiar paradigm: namely, the notion of "one's own computing device" with a fixed set of resources on which a database server is executing a workload. While tenant 1 may be uninterested in specifics of the computing device on which the tenant 1 workload 108 runs (instead having the service provider be responsible for picking/managing the computing devices), the tenant 1 may desire availability of resources in the multi-tenant database system 102 for executing the tenant 1 workload 108. The resources can include, for instance, CPU, buffer pool memory, working memory (e.g., for Hash/Sort operators, etc.), IO, and the like. Moreover, the idealized case when database resource(s) (e.g., a level of the resource 116) are exclusively dedicated to the tenant 1 workload 108 is referred to herein as a baseline case. The performance SLA 1 118 provides the tenant 1 with certain performance metrics for the tenant 1 workload 108 as though a set of resources in the actual (multi-tenant) database server were dedicated for the tenant 1 workload 108. With this model, the tenant 1 can be provided with performance no worse in the actual case than in the baseline case, or if the performance metric in the actual case is worse than in the baseline case, then a penalty function defined in the performance SLA 1 118 is invoked to determine how the service provider compensates the tenant 1 (e.g., by refunding money).

The performance SLAs 118-120 can differ from an SLA that is based on latency and/or throughput of queries. For instance, an SLA that is based on latency and/or throughput of queries may be used in a key-value store for get() and put() requests (e.g., many of these types of requests complete in less than 500 msec for a workload not exceeding 500 requests/sec). However, supporting performance SLAs based on query latency and/or throughput may be ineffective for SQL database systems. SQL is a rich and powerful language where queries can be complex and resource intensive. For instance, for a single query template (e.g., a stored procedure in a database management system), an inherent variability in query execution time (e.g., latency) can potentially be significant due to a variety of factors such as selectivity of predicates and transient effects in the database (e.g., which other queries are concurrently executing). Further, query latency can also change significantly as the data size or data distribution changes. Accordingly, these factors can lead to difficulties specifying a stable baseline for evaluating compliance with such SLAs. Thus, in contrast, a different model for the performance SLAs 118-120 based on resources is described herein, for which establishing such a baseline is feasible.

This model of performance SLAs 118-120 set forth herein can provide various advantages; however, it is to be appreciated that the claimed subject matter is not limited to the following. For instance, the performance SLAs 118-120 can provide a meaningful performance metric for the tenants. Moreover, since the performance SLAs 118-120 are based on performance relative to a baseline, the performance SLAs 118-120 can remain meaningful when the tenant workloads 108-110, data sizes, or data distributions of the tenants change over time. Further, performance metrics specified in the performance SLAs 118-120 for the actual and baseline cases can be metered at runtime.

The multi-tenant database system 102 includes a management component 122 that manages the tenant databases 104-106, the tenant workloads 108-110, and/or the resource 116. The management component 122 can further include a meter component 124 that can evaluate service provider compliance with terms of the performance SLAs 118-120 for the tenants in the multi-tenant database system 102. The meter component 124 can track an actual performance metric of the resource 116 of the hardware of the multi-tenant database system 102 for the tenant 1 workload 108 of the tenant 1. Moreover, the meter component 124 can determine a baseline performance metric of the resource 116 of the hardware of the multi-tenant database system 102 for the tenant 1 workload 108 of the tenant 1. The baseline performance metric determined by the meter component 124 can be based on a simulation as though the level of the resource 116 of the hardware of the multi-tenant database system 102 as set in the performance SLA 1 118 is dedicated to the tenant 1 workload 108 of the tenant 1. For example, it is contemplated that the level of the resource 116 of the hardware of the multi-tenant database system 102 specified in the performance SLA 1 118 can be a number of IOs per second, a latency for IOs, an amount of CPU utilization, an amount of working memory, an amount of buffer pool memory, or the like. Further, the meter component 124 can compare the actual performance metric with the baseline performance metric to evaluate compliance with the performance SLA 1 118.

Similarly, the meter component 124 can track actual performance metrics of the resource 116 of the hardware of the multi-tenant database system 102 for the remaining N−1 tenant workloads from the tenant workloads 108-110. Moreover, the meter component 124 can determine baseline performance metrics of the resource 116 of the hardware of the multi-tenant database system 102 for the remaining N−1 tenant workloads from the tenant workloads 108-110. Further, the meter component 124 can respectively compare the actual performance metrics with the baseline performance metrics to respectively evaluate compliance with the remaining N−1 performance SLAs from the performance SLAs 118-120.

With conventional SLA models, performance metrics provided to tenants are typically throughput (e.g., transactions per second) and/or latency (e.g., response time) of queries. In contrast, the performance SLAs 118-120 provide relative performance metrics. The relative performance metrics are associated with database resources (e.g., buffer pool hit rate is associated with buffer pool memory resource). For example, a tenant can buy a certain amount of a resource (e.g., 8 GB of buffer pool memory) and the performance SLA for that tenant can provide the same buffer hit rate for the tenant's workload as though the resources were dedicated to this tenant.

Utilization of the performance SLAs 118-120 set forth herein can provide resilience to changes in data and/or tenant workloads 108-110. According to an illustration, the response time of a SQL query can depend heavily on data size and data distribution, physical design, execution plan chosen by a query optimizer, etc. For a single stored procedure (or parameterized query), the response time and resources consumed can vary between different instances of that procedure depending on the parameter values. The variations, for instance, can be more pronounced across different queries (or query classes). Hence, in contrast to conventional SLA models, the performance SLAs 118-120 are resilient to such changes in data and/or tenant workloads 108-110 since the performance SLAs 118-120 attempt to measure performance for the tenant workload relative to what could be achieved for a predefined amount of resources.

Moreover, the performance SLAs 118-120 described herein can better support ad-hoc queries (e.g., queries that have not executed previously) as compared to conventional SLAs. For such queries, it can be challenging to define suitable performance metrics for conventional SLAs (e.g., latency) since the system can have little understanding of resource requirements and performance characteristics of the ad-hoc queries. Further, accurately estimating response time of an ad-hoc query (even on an isolated system) can be difficult at best.

The management component 122 can further include a compensation component 126 that can selectively compensate a tenant based on compliance with a performance SLA as detected by the meter component 124. Thus, the compensation component 126 can selectively compensate the tenant 1 based on compliance with the performance SLA 1 118 as detected by the meter component 124, and so forth. An amount of compensation (e.g., refund amount) can be determined by the compensation component 126 using a penalty function based on a degradation of performance. The penalty function can be specified by the performance SLA for the tenant (e.g., the performance SLA 1 118 can specify a particular penalty function to be used by the compensation component 126 for selectively compensating the tenant 1, etc.). Moreover, the degradation of performance can correspond to the comparison of the actual performance metric and the baseline performance metric implemented by the meter component 124.

According to an example, the meter component 124 can meter compliance with the performance SLA 1 118 independently during different time intervals. Following this example, a predefined duration for the different time intervals can be set by the performance SLA 1 118. For instance, the predefined duration can be on the order of seconds or minutes (e.g., 30 seconds, 60 seconds, 90 seconds, etc.); however, it is to be appreciated that the claimed subject matter is not so limited. Further, the compensation component 126 can selectively compensate the tenant 1 for each of the different time intervals based on the independently metered compliance with the performance SLA 1 118.

Moreover, the management component 122 can include an allocation component 128 that can allocate the resource 116 between the tenant workloads 108-110 based on the performance SLAs 118-120. Since the performance SLAs 118-120 introduce a trade-off between performance and cost, the allocation component 128 can allot the resource 116 between the tenant workloads 108-110 so as to mitigate degradation of performance metrics of tenants and/or an amount of compensation provided to the tenants.

Figure 2:
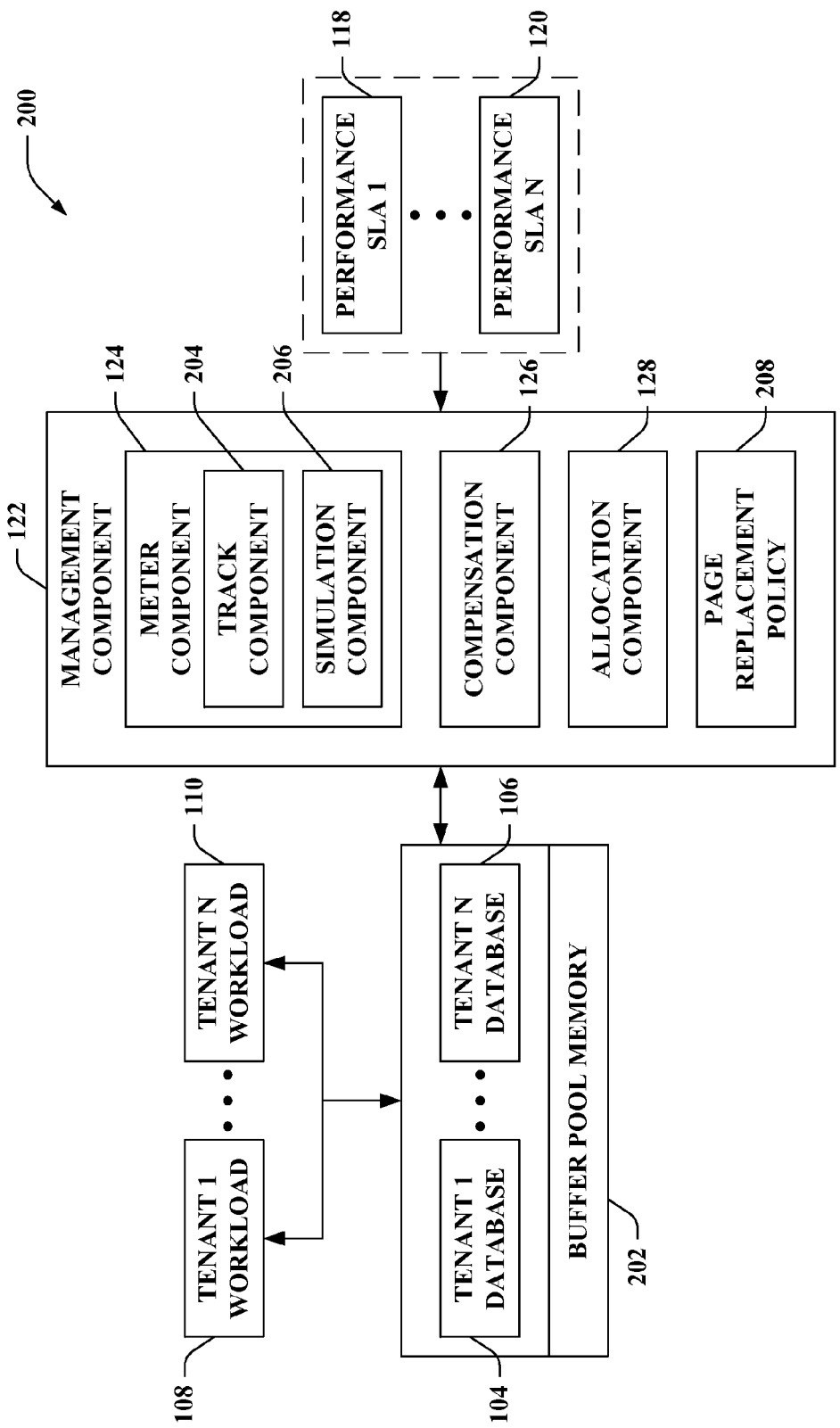
FIG. 2 illustrates a functional block diagram of an exemplary system that employs a performance SLA for buffer pool memory of a multi-tenant database system.

Now turning to FIG. 2, illustrated is a system 200 that employs a performance SLA for buffer pool memory 202 (e.g., the resource 116 of FIG. 1) of a multi-tenant database system (e.g., the multi-tenant database system 100 of FIG. 1). The system 200 includes the management component 122, which can further include the meter component 124, the compensation component 126, and the allocation component 128 as described herein. According to an example, the management component 122 can be a buffer pool manager; yet, the claimed subject matter is not so limited.

Many of the below examples describe performance SLAs (e.g., the performance SLAs 118-120) for the buffer pool memory 202; however, it is to be appreciated that such examples can be extended to performance SLAs for other resource(s) (e.g., CPU, working memory, IO, etc.) of a multi-tenant database system. For instance, performance SLAs for other resource(s) can be used in combination with or instead of the performance SLAs for the buffer pool memory 202. Also, as noted above, many of the examples relate to the tenant 1, the tenant 1 database 104, the tenant 1 workload 108, and the performance SLA 1 118 (e.g., corresponding to an amount of the buffer pool memory 202 for the tenant 1 workload 108 performed against the tenant 1 database 104); yet, it is to be appreciated that these examples can be extended to other tenants, tenant databases, tenant workloads, tenant applications, and performance SLAs.

The buffer pool memory 202 in a multi-tenant database system is a cache of database pages. A performance SLA for the buffer pool memory 202 can have the following structure. The performance SLA for the buffer pool memory 202 can be defined by the following components: (a) an amount of buffer pool memory M; (b) a performance metric type such as hit rate; (c) a predefined duration of time for a time interval at which compliance with the performance SLA is metered (t sec); (d) pricing information: how much the performance SLA costs the tenant ($X) for a time interval; and (e) a penalty function that describes how much the service provider refunds the tenant for a time interval when the performance metric is not met.

According to an example, the performance SLA 1 118 for the buffer pool memory 202 can have the following structure. The performance SLA 1 118 can set a predefined duration of time t (e.g., 30 seconds, 60 seconds, 90 seconds, etc.) for time intervals. Moreover, the tenant 1 may pay $X for M GB (e.g., 4 GB) of the buffer pool memory 202 in the multi-tenant database system. A performance metric type associated with the buffer pool memory 202 can be a hit rate, which can be a fraction of pages accessed by the tenant 1 workload 108 that are found in the buffer pool memory 202. The performance SLA 1 118 can provide that the tenant 1 workload 108 will achieve at least the hit rate of the baseline case where M GB of buffer pool memory is dedicated for this tenant. If the multi-tenant database system is unable to provide an actual hit rate for the tenant 1 workload 108 that is equal to or greater than the baseline hit rate as detected by the meter component 124 during a given time interval having the predefined duration, then the compensation component 126 can invoke a penalty function specified in the performance SLA 1 118 to determine how much money the service provider refunds to the tenant 1 for that time interval.

As noted above, the performance metric for a performance SLA for the buffer pool memory 202 can be a hit rate. The buffer pool memory 202 in a multi-tenant database system (e.g., a database management system (DBMS)) is a cache of database pages. When a query accesses a page, if it is found in the buffer pool memory 202, then that access is referred to as a hit. On the other hand, if the page is not found in the buffer pool memory 202, then that access is referred to as a miss and an IO is then used to fetch the page from disk (not shown). Thus, for a buffer pool memory of a given size and for a given workload (e.g., sequence of page accesses), a hit rate can be defined as follows:

$$\text{Hit rate }(HR) = \frac{\text{Number of pages found in cache}}{\text{Total number of page accesses}} = \frac{h}{z} \quad (1)$$

In the foregoing, Z is the total number of page accesses and h is the number of page accesses found in the buffer pool. Note that $0 \le HR \le 1$. The hit rate can be a function of two variables (e.g., HR can have two implicit parameters in equation (1) above): (1) a size of the buffer pool memory 202 (e.g., an amount of memory in the buffer pool); and (2) the workload (e.g., sequence of pages accessed). In general, for a given workload, the hit rate increases monotonically with the amount of memory in the buffer pool. Moreover, for a given workload, a higher locality of page accesses leads to a higher hit rate (or a lower locality of page accesses leads to a lower hit rate). For example, a scan of a large index typically accesses many distinct pages (e.g., oftentimes accessing each page once) and therefore has a low hit rate. By way of another example, consider an operation such as an Index Nested Loops join; accordingly, in this case, upper-level index pages of the B-Tree of the inner side of the join are likely to be accessed multiple times, leading to a higher hit rate.

As described earlier, a performance SLA is relative to a particular level or amount of a resource (e.g., amount of the buffer pool memory 202). According to an illustration, assume that the tenant 1 has obtained the performance SLA 1 118 that provides M GB of the buffer pool memory 202. In effect, the service provider sets forth that an actual hit rate in the tenant 1 workload 108 for the tenant 1 will be no worse than a baseline hit rate in a setting where the tenant 1 workload 108 had been dedicated M GB of the buffer pool memory 202; however, the service provider does not actually dedicate M GB of the buffer pool memory 202 to the tenant 1 workload 108. Thus, the service provider supplies isolation from the effects of other tenants with respect to the buffer pool memory 202. Alternatively, if the actual hit rate is worse than the baseline hit rate, then a penalty function is invoked (e.g., by the compensation component 126) depending on the degree to which the actual and baseline hit rates differ. Accordingly, hit rate degradation can be determined as follows:

$$\text{Hit rate degradation (HRD)} = \text{Max}\{0, HR_B - HR_A\} \quad (2)$$

In equation (2), $HR_B$ is the hit rate in the baseline case, and $HR_A$ is the hit rate in the actual (e.g., multi-tenant) case. Observe that the Max function is employed since in general it is possible that $HR_A$ is greater than $HR_B$. For instance, this may occur if the tenant 1 gets more than M GB of the buffer pool memory 202 in the actual case—in such a scenario, the hit rate degradation is determined to be 0. From the above definitions of HR and HRD, it follows that $0 \le HRD \le 1$. Substituting the definition of HR from equation (1) in equation (2) leads to the following:

$$HRD = \text{Max}\left\{0, \frac{h_B - h_A}{Z}\right\} \quad (3)$$

In equation (3), $h_B$ is the number of page accesses found in the buffer pool in the baseline case, and $h_A$ is the number of page accesses found in the buffer pool in the actual (e.g., multi-tenant) case.

Figure 3:
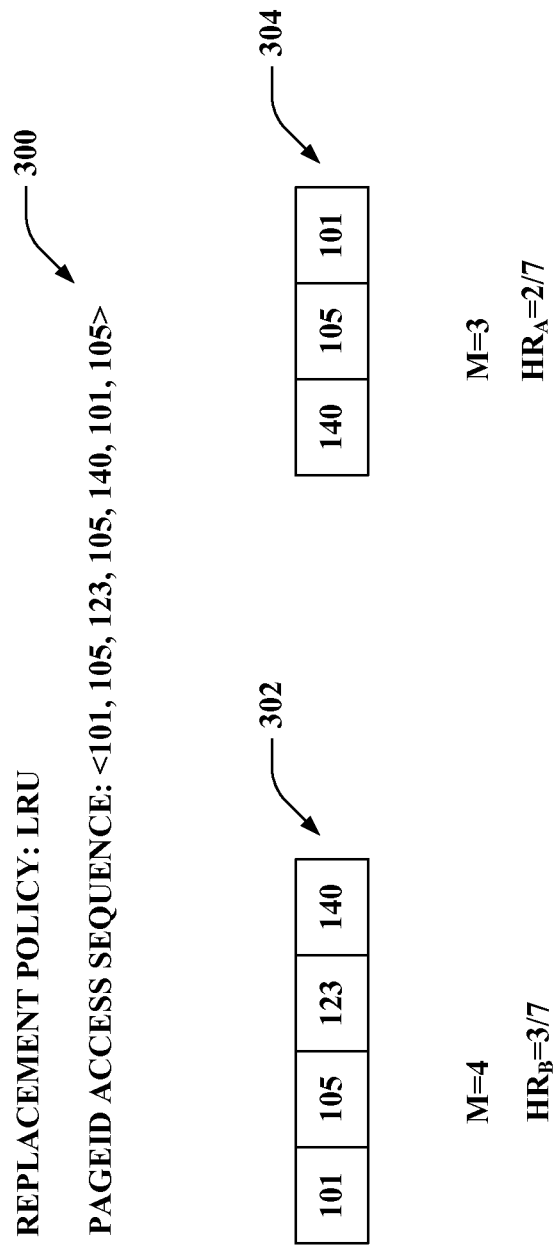
FIG. 3 illustrates an exemplary diagram depicting hit rate degradation for an exemplary tenant workload.

FIG. 3 illustrates a diagram depicting hit rate degradation for an exemplary tenant workload 300. The tenant workload 300 includes a sequence of pages accessed (e.g., page ID access sequence). For the purposes of this example, suppose a page replacement policy used is Least Recently Used (LRU). In accordance with the depicted example, a performance SLA for the tenant can set forth that the tenant is to be provided with an amount of buffer pool memory for retaining 4 pages (e.g., M=4) in the baseline case; however, due to demands of other tenants in the multi-tenant database system, the tenant may receive an amount of buffer pool memory for retaining 3 pages (e.g., M=3) in the actual case. For the sequence of pages accessed by the tenant workload 300, $HR_B = 3/7$ and $HR_A = 2/7$. The final contents of the buffer pool after the pages in the sequence have been accessed for the baseline and actual cases are shown at 302 and 304, respectively. Thus, $HRD = 3/7 - 2/7 = 1/7$.

Figure 4:
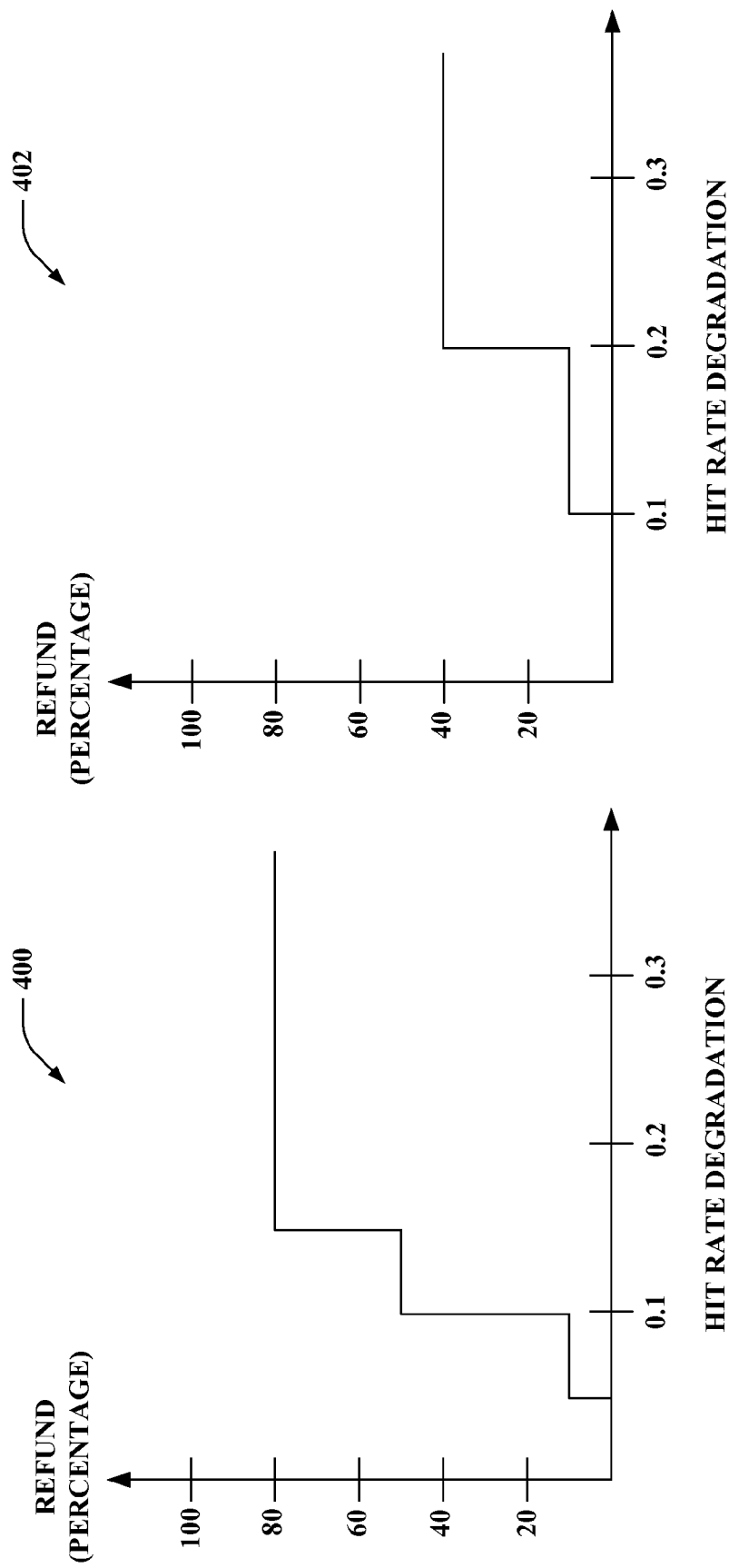
FIG. 4 illustrates exemplary penalty functions that can be specified by performance SLAs.

With reference to FIG. 4, illustrated are two exemplary penalty functions: namely, a penalty function 400 and a penalty function 402. As set forth above, a performance SLA includes a penalty function; according to an example, a first performance SLA can include the penalty function 400 and a second performance SLA can include the penalty function 402. A penalty function can define how the service provider will compensate a tenant if the performance metric provided in the performance SLA is not delivered. Moreover, a penalty function quantifies the performance versus cost trade-off. For the tenant, a penalty function defines how much money is refunded by the compensation component 126 of FIG. 1 as a function of performance degradation. For the service provider, a penalty function provides a basis upon which the allocation component 128 of FIG. 1 prioritizes resource allocation across the tenant workloads 108-110 of different tenants.

Many of the examples set forth herein describe a penalty function as being a step function. However, it is to be appreciated that the penalty function can be substantially any other type of function.

In the case of performance SLAs for buffer pool memory, an x-axis of a penalty function is a hit rate degradation (HRD) and a y-axis is a penalty (e.g., percentage money refunded to a tenant) as shown in FIG. 4. As illustrated, the penalty function 400 is more stringent (e.g., attaches greater importance to performance) than the penalty function 402. Thus, the penalty function 400 attaches a higher penalty for hit rate degradation compared to the penalty function 402. For example, a HRD of 0.1 incurs a penalty of a 50% refund for the penalty function 400 as compared to a penalty of a 10% refund for the penalty function 402. It is to be appreciated, however, that the claimed subject matter is not limited to the example penalty functions 400 and 402 shown in FIG. 4.

Again, reference is made to FIG. 2. As set forth above, a performance SLA can include pricing information (e.g., indication of an amount of money paid by a tenant for the performance SLA). Two factors of the performance SLA can affect pricing. First is the amount of resources (e.g., the amount of the buffer pool memory 202). Second is the penalty function, in particular how stringent is the penalty versus HRD tradeoff. According to an illustration, a service provider may offer packages that combine multiple factors. For instance, the service provider may offer a first package that provides 8 GB of the buffer pool memory 202 with the penalty function 400 of FIG. 4 that costs $X/minute, and a second package that provides 2 GB of the buffer pool memory 202 with the penalty function 402 of FIG. 4 that costs $Y/minute. The tenant can select one of the available packages. The values of $X and $Y can be decided by the service provider based on a variety of factors including capital and operating costs, etc. Further, it is noted that actual payment by the tenant need not be done at time interval boundaries (e.g., payment can be made monthly instead) although the performance SLA may be metered per time interval. It is contemplated, however, that the claimed subject matter is not limited to the foregoing exemplary packages.

As provided above, the meter component 124 can evaluate service provider compliance with terms of the performance SLAs 118-120 for the tenants in the multi-tenant database system. According to an example, consider the tenant 1 who has selected the performance SLA 1 118 for the buffer pool memory 202. The tenant 1 workload 108 can be executing on the database server. Further, the performance metric upon which the performance SLA 1 118 is based can be the HRD described by equation (3). Therefore, to enforce the performance SLA 1 118, the meter component 124 can measure the HRD for each time interval having a time granularity at which the performance SLA 1 118 is enforced (e.g., specified by a predefined duration in the performance SLA 1 118). Since the performance SLA 1 118 can be enforced for each time interval, having a relatively fine grained time interval (e.g., 30 seconds, 60 seconds, 90 seconds, etc.) can allow for holding the service provider accountable for performance at such fine time granularity. Thus, the meter component 124 in the DBMS can measure the HRD for the tenant 1 at such time intervals. Then, depending on the measured HRD and the penalty function provided by the performance SLA 1 118, the amount of money to be refunded to the tenant (if any) can be computed by the compensation component 126. The meter component 124 can similarly measure HRDs for other tenants, and the compensation component 126 can similarly selectively compensate the other tenants.

The meter component 124 can further include a track component 204 and a simulation component 206. The track component 204 can measure an actual hit rate of the buffer pool memory 202, and the simulation component 206 can measure a baseline hit rate of the buffer pool memory 202.

When measuring the actual hit rate of the buffer pool memory 202 for the tenant 1 workload 108, the track component 204 can measure the number of pages accessed by the tenant 1 workload 108. For each of the pages accessed by the tenant 1 workload 108, the track component 204 can determine whether the page is found in the buffer pool memory 202. Moreover, the track component 204 can compute the actual hit rate as a fraction of the pages accessed by the tenant 1 workload 108 that are found in the buffer pool memory 202.

When measuring the baseline hit rate of the buffer pool memory 202 for the tenant 1 workload 108, the simulation component 206 can simulate page replacement that would have been carried out for the tenant 1 workload 108 given an amount of the buffer pool memory 202 being dedicated to the tenant 1. The page replacement can be simulated in a baseline buffer pool by the simulation component 206 based on a page replacement policy 208. According to an example, the simulation component 206 can measure a number of pages accessed by the tenant 1 workload 108; however, it is contemplated that the number of pages accessed by the tenant 1 workload 108 can alternatively be measured by the track component 204. For each of the pages accessed by the tenant 1 workload 108, the simulation component 206 can determine whether the page is found in the baseline buffer pool. Further, the simulation component 206 can compute the baseline hit rate as a fraction of the pages accessed by the tenant 1 workload 108 that are found in the baseline buffer pool.

The baseline buffer pool can be maintained by the simulation component 206 (e.g., in memory). Moreover, the baseline buffer pool can include page IDs of pages accessed by the tenant 1 workload 108, while lacking contents of the pages accessed by the tenant 1 workload 108.

According to an example, to compute HRD (e.g., as set forth in equation (3)), three quantities for the tenant 1 workload 108 of tenant 1 can be measured: $h_B$, (the number of hits in the baseline), $h_A$ (number of hits in the actual system), and Z (the total number of pages accessed by the tenant 1 workload 108). The track component 204 can measure $h_A$ and Z, while the simulation component 206 can measure $h_B$.

The track component 204 can use counters to measure the number of hits in the actual system and the total number of pages accessed in the buffer pool memory 202. Further, the track component 204 measures the foregoing values per tenant.

Figure 5:
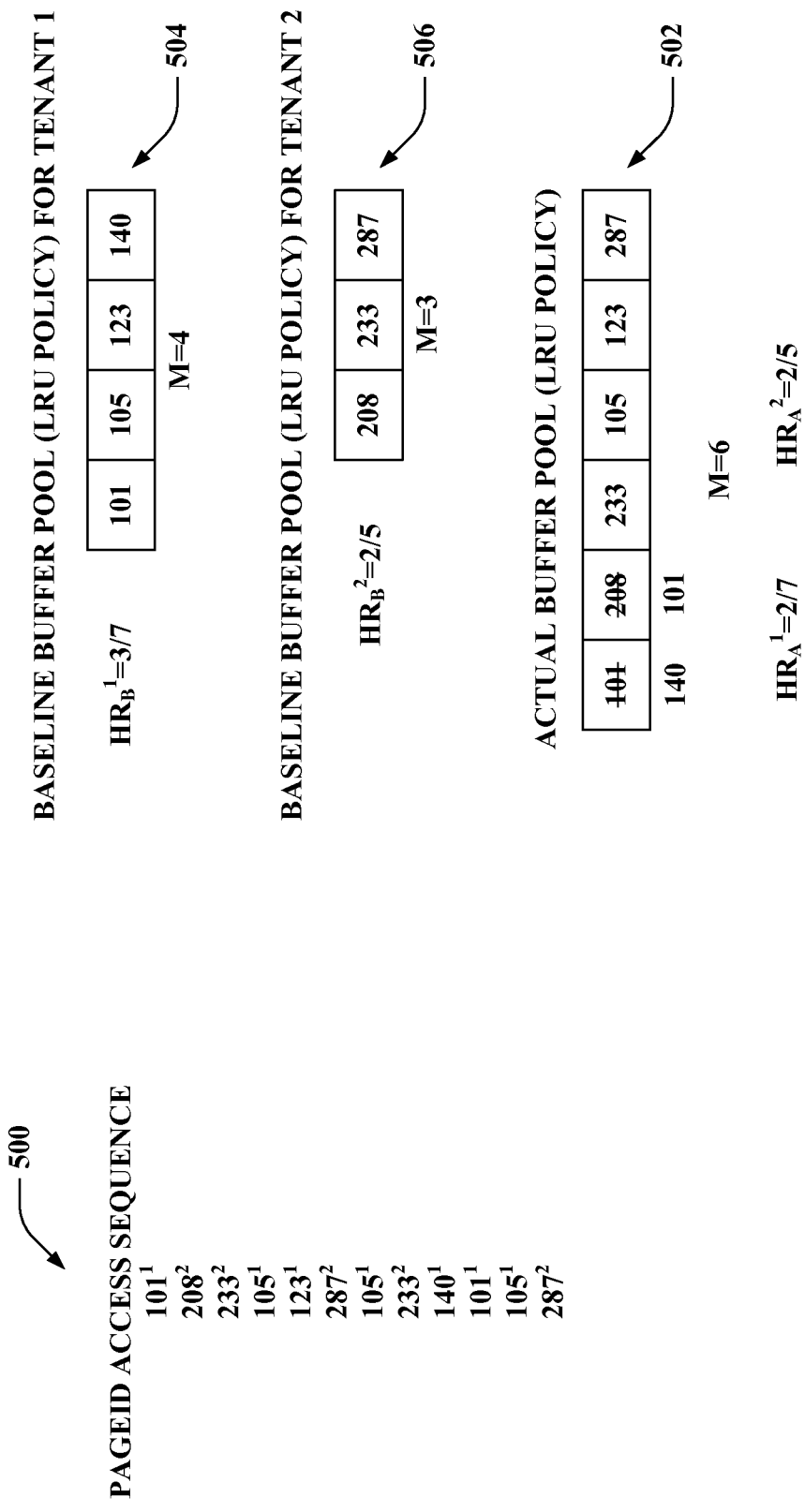
FIG. 5 illustrates exemplary baseline and actual buffer pools for two tenants.

With reference to FIG. 5, illustrated are exemplary baseline and actual buffer pools for two tenants. FIG. 5 is provided as an example depicting measurement of a number of hits in a baseline for a workload of a tenant (e.g., which can be effectuated by the simulation component 206 of FIG. 2). It is to be appreciated, however, that the claimed subject matter is not limited to such example.

The example of FIG. 5 shows two tenants: tenant 1 and tenant 2. Execution of the workloads of the two tenants results in a sequence of page accesses 500 (e.g., page ID access sequence). Superscripts in the sequence of page accesses 500 denote which tenant accessed the page. In the depicted example, an actual buffer pool has 6 pages. Further, a performance SLA for the tenant 1 can specify that the tenant 1 is to receive 4 pages in the baseline case, while a performance SLA for the tenant 2 can specify that the tenant 2 is to receive 3 pages in the baseline case. Pages that are in the actual buffer pool at the end of the sequence of page accesses 500 are shown at 502. For the actual case, an actual hit rate achieved for the tenant 1 is $HR_A^1 = 2/7$ and an actual hit rate achieved for the tenant 2 is $HR_A^2 = 2/5$. Also shown at 502 are pages that were replaced (e.g., 101 replaced by 140 and 208 replaced by 101 assuming an LRU policy). Moreover, a baseline case for tenant 1 is shown at 504, and a baseline case for tenant 2 is shown at 506. In the baseline case for tenant 1, a baseline buffer pool has 4 pages, a first 4 page accesses from the sequence of page accesses 500 for the tenant 1 are misses, but a last 3 page accesses from the sequence of page accesses 500 for the tenant 1 are hits. Thus, $HR_B^1 = 3/7$. Likewise, in the baseline case for tenant 2, a baseline buffer pool has 3 pages, a first 3 page accesses from the sequence of page accesses 500 for the tenant 2 are misses, but a last 2 page accesses from the sequence of page accesses 500 for the tenant 2 are hits; accordingly, $HR_B^2 = 2/5$.

Again, reference is made to FIG. 2. The simulation component 206 can measure the number of hits in the baseline $HR_B$ for each tenant. The simulation component 206 can use the following information in order to compute $HR_B$ for a tenant: (a) the sequence of pages accessed by that tenant; and (b) the number of pages provided to the tenant (e.g., the amount of the buffer pool memory 202) specified in a performance SLA for that tenant. Moreover, the simulation component 206 can use the page replacement policy 208 of the management component 122 (e.g., of the DBMS) to simulate page replacement that the DBMS would have carried out for the given workload sequence and the amount of buffer pool memory 202 specified in the performance SLA, assuming that the amount of the buffer pool memory 202 were dedicated to the workload of the tenant.

When evaluating the baseline hit rate, the simulation component 206 can employ a baseline buffer pool (e.g., a data structure) for each of the N tenants. Unlike the buffer pool memory 202, the baseline buffer pool need not include actual pages. Rather, the baseline buffer pool can track page IDs of pages accessed by a tenant T, and bookkeeping set forth by the page replacement policy 208.

The following pseudocode sets forth an example of metering that can be employed by the meter component 124 (e.g., the track component 204 and the simulation component 206). It is contemplated, however, that the claimed subject matter is not limited to this example.

OnPageAccess (TenantID T, Page P)
1. $Z^T$++ // increment number of pages accessed by tenant T
2. If page P is found in actual buffer pool, $h_A^T$++
3. Else If free pages available in actual buffer pool, allocate new page and fetch P from disk
4. Else execute page replacement policy to evict a page from the actual buffer pool and fetch P from disk
5. // Now perform bookkeeping for computing hit rate in baseline
6. If page ID P is found in the baseline buffer pool for tenant T, $h_B^T$++
7. Else // simulate page replacement in baseline buffer pool
   a. Identify page ID P' with lowest score according to page replacement policy of DBMS
   b. Evict page ID P' from baseline buffer pool and insert page ID P into it.

As described above, the buffer pool memory 202 is a cache for database pages. If a page (e.g., page P in the above pseudocode) accessed by a query (e.g., from one of the tenant workloads 108-110) is not found in the buffer pool memory 202, then an IO is used to obtain the page from disk. Further, if there are not free pages available in the buffer pool memory 202 for the page obtained from the disk, then the allocation component 128 can employ the page replacement policy 208 to select a page for eviction from the buffer pool memory 202. Thus, the allocation component 128 can select the page to evict from the buffer pool memory 202 at least in part based upon the page replacement policy 208.

It is contemplated that various types of page replacement policies can be employed by multi-tenant database systems. Examples of page replacement policies include LRU, DBMIN, LRU-K (e.g., which tracks times of a last K references to a page and uses that information to statistically estimate interarrival time of references per page, where K is an integer), 2Q (Two Queue), ARC (Adaptive Replacement Cache), CAR (Clock with Adaptive Replacement), and so forth. Such policies provide various approaches that attempt to replace a page that is least likely to be accessed next.

According to an example, the page replacement policy 208 can be a variant of LRU-2, which tracks a last K=2 references per page. Following this example, the variant of LRU-2 can maintain a free list of buffers from which buffers are allocated when a query requires a new buffer. When the number of buffers in the free list becomes small, it reclaims a certain fraction of pages f currently in the buffer pool memory 202 and places them in the free list. Thus, it can be attempted to reclaim the buffers that are least likely to be accessed (e.g., having a largest estimated interarrival time). Since K=2, this means identifying buffers whose second most recent access is the furthest back in time. Observe that determining these pages exactly could be expensive. Therefore, for efficiency, the foregoing can be effectuated by sampling n pages and determining a cutoff threshold among those pages for reclaiming the desired fraction f of pages. Then, pages whose second last access time is below the cutoff value can be reclaimed (similar to the CLOCK algorithm).

Following the foregoing example where the page replacement policy 208 is a combination of LRU-2 and CLOCK, the following can be maintained: (a) a hash table of page IDs per tenant, and associate the LRU-2 counters with each page ID; and (b) a free list to store page IDs reclaimed by the page replacement policy 208. It is noted that the simulation of the page replacement policy (in Step 7 of the above pseudocode) captures various details. For example, the policy defines a notion of correlated references to a page to avoid giving unnecessary importance to pages that experience a burst of references very close to one another (e.g., within a single transaction). Such correlated references are treated as a single reference to the page. Another detail that can be addressed in the simulation is that modern memory architectures are Non-Uniform Memory Access (NUMA) (e.g., each processor has its own memory). Buffer pool page replacement can therefore be separately performed for each processor. It is contemplated, however, that the aforementioned algorithm can be adapted to be used with a different page replacement policy by modifying Step 7 of the above pseudocode.

It is contemplated that the allocation component 128 and the simulation component 206 can use the same page replacement policy (e.g., the page replacement policy 208) or different page replacement policies. For instance, if different page replacement policies are employed, the page replacement policy in Step 4 of the above pseudocode (e.g., for the actual multi-tenant database system) can be different from the page replacement policy used in Step 7 of the above pseudocode (e.g., used for simulating the baseline case). According to an example, different page replacement policies can be used in a multi-tenant setting so that the DBMS can take into account an impact of the performance SLAs 118-120 in addition to traditional considerations such as, for instance, frequency and recency of page accesses, when making page replacement decisions in the actual buffer pool (e.g., in the buffer pool memory 202).

Performance SLA metering can be associated with CPU overheads and memory overheads. For instance, for each page access in a workload, Steps 5-7 in the above pseudocode can represent additional CPU overheads. Observe that in the case when the page ID is found in the baseline buffer pool (Step 6), the overheads pertain to finding the page ID in a hash table and incrementing a counter. When the page ID is not found in the hash-table (Step 7), then additional CPU overheads can be incurred to simulate page replacement in the baseline buffer pool. Since this code is invoked when the page ID is not found in the baseline buffer pool, the CPU time incurred can be proportional to the hit rate of the tenant's workload in the baseline buffer pool. Yet, across a variety of different settings, this overhead typically can be small (e.g., within bounds of measurement error).

According to another illustration, metering can be associated with memory overheads. There are two components of memory overheads. First, there is a fixed overhead per page in the actual buffer pool, used to track to which tenant that page belongs. For instance, each page belongs to exactly one tenant (since tenants do not share data). Assuming that a tenant ID can be stored in 4 bytes and each page is 8 KB, this fixed overhead can be 0.048% per page in the actual buffer pool. Second, there is a variable amount of memory overhead for the data structures of the baseline buffer pool of each tenant. This depends on the memory provided to the tenant (per the performance SLA) for the baseline case. In particular, in the worst case, this is the memory for tracking page IDs and associated page replacement counters (e.g., LRU-2 counters) per page provided to the tenant for the baseline case. Observe that if the tenant's workload does not actually fill its size as provided in the performance SLA, then the worst case may not be reached. The following is provided as an example of variable memory overhead. Consider an actual buffer pool of size 16 GB and a page size of 8 KB. Suppose the tenants in total are provide 32 GB buffer pool memory in the performance SLAs; and each tenant accesses sufficient numbers of pages such that their respective baseline buffer pools are full. Suppose also that a bookkeeping overhead of the page replacement scheme is 40 bytes per page. In that case, the total variable amount memory may be 140 MB (which is around 0.85% of 16 GB). Further, it is noted that the variable memory overhead may also depend on how much the service provider overcommits memory on the system (e.g., the greater the degree of overcommitment, the higher the worst case memory overhead). The overhead may be highest when all tenants are simultaneously active and each tenant's workload accesses enough pages to fill up their respective specified memory.

By way of another example, since the performance SLAs 118-120 introduce a trade-off between performance and cost, it is contemplated that the allocation component 128 can account for such tradeoff Thus, the allocation component 128 can employ the page replacement policy 208 as well as additional factor(s) based on the performance SLAs 118-120 to allocate the buffer pool memory 202. In contrast, conventional approaches typically fail to consider cost while attempting to maximize a cache hit rate for a workload. However, with the performance SLAs 118-120, a monetary cost is associated with resource allocation decisions via the penalty function. Thus, in a multi-tenant DBMS with the performance SLAs 118-120 where different tenants have potentially very different performance versus cost sensitivities, it may no longer be sufficient for the DBMS to use traditional page replacement policies.

By being SLA-aware, the allocation component 128 can potentially benefit both the tenant as well as the service provider. For instance, tenants whose performance SLA demands higher performance (for which they also pay more) may expect a higher level of service.

Consider the following exemplary scenario with the two tenants as shown in FIG. 5. Assume that tenant 1 is provided a buffer pool size of M=4 for the baseline case, and tenant 2 is provided a buffer pool size of M=3 for the baseline case. The actual buffer pool has size M=6. Also suppose that tenant 1's penalty function is the penalty function 400 of FIG. 4 and tenant 2's penalty function is the penalty function 402 of FIG. 4. The penalty function 400 is more stringent than the penalty function 402 (e.g., tenant 1 has higher demands on performance than tenant 2). Further, assume that tenant 1 pays $5 and tenant 2 pays $2 for their respective performance SLAs. Suppose the DBMS uses a page replacement policy that is not SLA-aware (e.g., LRU as shown in FIG. 5). In that case $HR_B^1=3/7$ and $HR_A^1=2/7$. Thus, the hit rate degradation for tenant 1, $HRD^1$ is 1/7=14%. According to the penalty function 400, this result in a penalty of 60% of $5=$3. For tenant 2, $HR_B^2=2/5$ and $HR_A^2=2/5$, thus $HRD^2$ is 0. Hence, according to the penalty function 402, no money is refunded to tenant 2. In contrast, consider an SLA-aware page replacement algorithm (e.g., performed by the allocation component 128) that when page ID 140 is accessed, the page ID 208 is chosen as the victim rather than the page ID 101. In that case, $HR_A^1=3/7$, and hence $HRD^1 \times 0$ and no money would have to be refunded to tenant 1. Observe that in this particular example, $HR_A^2$ is still 2/5, and thus tenant 2's performance is unaffected (and no refund is necessary). Thus, the service provider would have earned $3 more in revenue by being SLA-aware during buffer pool page replacement.

In general, when resources in the DBMS are overcommitted by the service provider (e.g., sum of the buffer pool memory provided to the tenants in the performance SLAs 118-120 is greater than available buffer pool memory 202), at least some tenants may have a HRD greater than 0. Thus, some tenants will experience a lower hit rate than in their corresponding baseline. From the service provider's point of view, the allocation component 128 can attempt to maximize revenue (e.g., minimize penalty incurred due to performance SLA violations).

The allocation component 128 can allocate a resource of a multi-tenant database system between the tenant 1 workload 108 and disparate workloads of disparate tenants based on the performance SLA 1 118 and disparate performance SLAs for the disparate tenants. According to an example, the allocation component 128 can allocate the buffer pool memory 202 based on importance of a page that is currently in the buffer pool memory 202. When a page needs to be evicted from the buffer pool memory 202, a least important page according to this measure as determined by the allocation component 128 can be evicted from the buffer pool memory 202. The allocation component 128 can determine the importance of a page using an SLA-aware replacement policy that incorporates two factors. First, the allocation component 128 can determine a likelihood of a page being accessed in the future by a workload (e.g., based on the page replacement policy 208). Second, the allocation component 128 can determine an expected penalty incurred if the page is evicted from the buffer pool memory 202. Thus, the allocation component 128 can select a page for eviction from the buffer pool memory 202 based on the expected penalty incurred if the page is evicted from the buffer pool memory 202 and/or based on a likelihood of the page being accessed by one of the tenant workloads 108-110. In contrast, conventional approaches typically do not account for such an expected penalty when determining which page to evict from the buffer pool memory 202.

According to an example, the page replacement policy 208 employed by the allocation component 128 can be LRU-K (e.g., used to determine the first factor). LRU-K can use a statistical approach to modeling page reference behavior, where each access to a page is modeled as a random variable. Each page p can have a probability of being the next page to be accessed in a sequence of page accesses. The policy tracks for each page p the timestamps of the last K references to p. These K timestamps are used to estimate the interarrival time ($I_p$) between successive accesses to the page p. Thus, the probability that p is the next page to be accessed is ($1/I_p$). Hence, at any point in time, the importance of a page using LRU-K is $q_p=(1/I_p)$.

The allocation component 128 can combine the importance of the page determined using LRU-K with a measure based on the expected penalty incurred if the page is evicted from the buffer pool memory 202. The allocation component 128 can determine the expected penalty incurred if the page is evicted from the buffer pool memory 202 based upon an estimation of a hit rate degradation. The combined measure of importance of a page p outputted by the allocation component 128 can be referred to as $C_p$. Let pf be the expected penalty function used in a performance SLA (e.g., one of the performance SLAs 118-120) of the tenant to whom page p belongs. Suppose the tenant pays $d for the performance SLA. Let e be the estimated HRD that the tenant's workload can achieve for the time interval. Then, $C_p$ can be defined by equation (4) below:

$$C_p = q_p \times d \times pf(e) \qquad (4)$$

It is noted that this definition of importance of a page can satisfy the following properties. If all tenants have substantially similar performance SLAs and workloads (e.g., their values of d×pf(e) are substantially similar), then the policy behaves the same as LRU-K. If two pages belonging to different tenants have substantially similar importance according to LRU-K (e.g., the values of $q_p$ are substantially similar for both pages), the page belonging to the tenant whose expected penalty for this time interval d×pf (e) is larger has higher importance. The CPU overheads for implementing the policy can be low. Yet, the claimed subject matter is not so limited.

Figure 6:
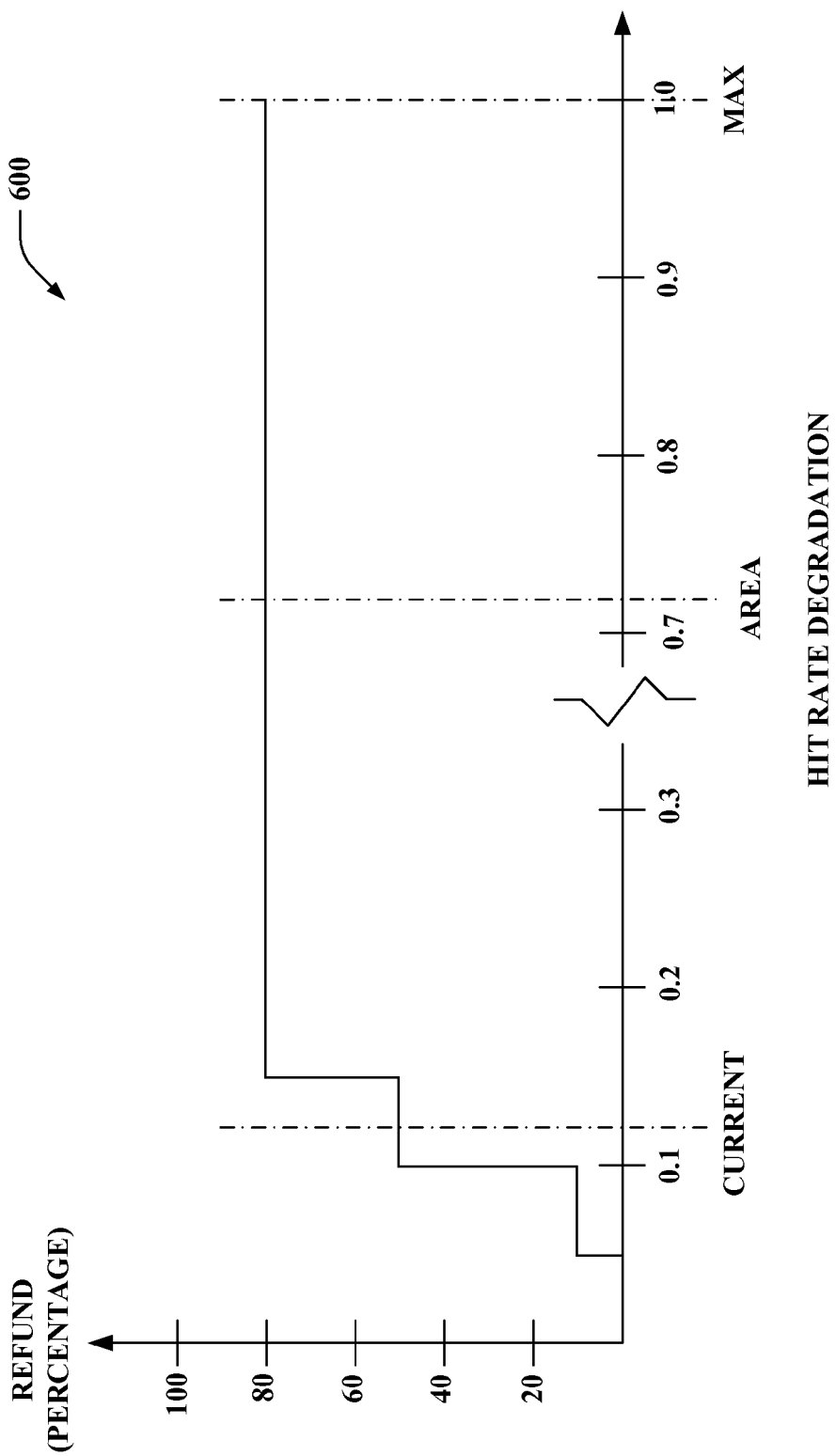
FIG. 6 illustrates exemplary hit rate difference estimation heuristic measures on an exemplary penalty function.

Moreover, the allocation component 128 can estimate the HRD that the tenant's workload can achieve for the time interval e. The allocation component 128 can employ one of the following heuristic measures to estimate e since e can be difficult to estimate due to not knowing the sequence of pages that this tenant is going to access in the future. Moreover, FIG. 6 illustrates exemplary hit rate difference estimation heuristic measures on an exemplary penalty function 600.

MAX: This approach makes a worst case assumption. Accordingly, it is assumed that the hit rate for this time interval could be as high as 1.0. As depicted in the exemplary penalty function 600 of FIG. 6, the MAX heuristic measure provides pf(1.0)=0.8.

AREA: This approach assumes that the hit rate for this interval could be anywhere with equal likelihood, and thus, uses the weighted average of the steps in the penalty function 600 (e.g., effectively the area under the curve of the penalty function). In the example of FIG. 6, the AREA heuristic measure provides an estimated e of 0.715. Thus, pf(0.715) =0.8.

CURRENT: In this approach, at any point in time it estimates e as the current HRD as measured by the meter component 124 of FIG. 1 at that point in time. In effect, this heuristic assumes that the hit rate difference measured thus far does not vary much during the course of the time interval. For example, referring to FIG. 6, if the current HRD measured by SLA metering is 0.12, then e=0.12 and pf (0.12)=0.5.

It is noted that the CURRENT heuristic uses the HRD from SLA metering to estimate the hit rate difference for the current time interval (e). In the beginning of a time interval, tenants can start afresh (e.g., HRD is 0 for tenants at the start). Thus, during the early part of the interval, the SLA-aware policy can treat tenants relatively uniformly and may not be able to distinguish adequately between tenants with performance SLAs that are very different (e.g., a stringent penalty function and a lax penalty function). Thus, if time intervals are small, this can cause the CURRENT heuristic to lose some opportunity to leverage differences between tenants (e.g., there is a lag time). In order to overcome this, it can be beneficial to retain history of HRD for a tenant from the last time interval. At any point during the current time interval, the CURRENT heuristic can use the maximum of the current HRD and the HRD from the previous time interval. This can provide a smoother behavior across time intervals. Moreover, it can be observed that the MAX heuristic and the AREA heuristic may not be affected by the foregoing since such heuristics do not rely on the HRD from SLA metering to estimate the hit rate difference for the current interval.

Many of the foregoing examples pertain to a model of performance SLAs for buffer pool memory. Yet, it is to be appreciated that performance SLAs for other resources of hardware can additionally or alternatively be employed. Accordingly, various other examples pertaining to performance SLAs are set forth below; however, it is contemplated that the claimed subject matter is not limited to the following examples.

According to an example, performance SLAs for other resources can be used. Query processing in a DBMS employs resource beyond buffer pool memory, such as CPU, IO, and private working memory for Hash/Sort operators. Hence, performance SLAs that provide performance metrics, metering mechanisms for the baseline and actual case, etc. can be used for such resources. Moreover, resource scheduling policies can be adapted to exploit these performance SLAs.

By way of another example, multiple performance SLAs can be combined. Following this example, if performance SLAs are provided based on resources, it is possible for a tenant to sign up for multiple different performance SLAs. By way of illustration, consider a tenant with a performance sensitive online transaction processing (OLTP) application. The tenant may sign up for suitable performance SLAs for buffer pool memory, CPU and IO. Another tenant whose workload involves more complex query processing (e.g., involving large Hash/Sort operators) may select to also sign up for performance SLAs for working memory, etc. In a situation where the tenant signs up for multiple performance SLAs (e.g., one for buffer pool memory and one for IO), metering the metrics of each performance SLA can be done independently; however, there may be choices for pricing and SLA enforcement. An option may be that the performance SLAs are paid for and enforced independently. Another alternative may be to have a single payment, but enforcement takes into account the interactions (e.g. the one with higher penalty is enforced). Yet, the claimed subject matter is not limited to the foregoing.

By way of yet another example, placement of tenants at nodes can be based upon the performance SLAs 118-120. The decision of a service provider concerning which tenants to co-locate on a given node can be influenced by how well the performance SLAs 118-120 can be met, and how much revenue can be made, for instance. Factors that can affect this decision include: (a) the degree to which a service provider wants to overcommit resources on the computing device; (b) how stringent the penalty function in the performance SLA is; and (c) characteristics of the tenant's workload such as how much locality exists in the page accesses (this can have a big impact on how much memory is actually used to meet the hit rate promised to the tenant).

It is also contemplated that the techniques set forth herein can be relevant to an infrastructure-as-a-service (IaaS) architecture (in addition to or instead of a PaaS architecture). In an IaaS architecture, a database server can run inside a virtual machine (VM). On a given computing device, there can be multiple such VM instances running. In contrast to PaaS architectures, in IaaS the service provider can potentially reserve (e.g., dedicate) the resources of the computing device such as memory for the tenant and not allow it to be shared with other tenants on the same computing device. However, it is noted that even in virtualized environments, it is possible for memory to be shared across VMs. For example, it is possible for a computing device with 4 GB physical memory to concurrently host four VMs each with a promised memory of 2 GB memory; following this example, the physical memory available to a VM can be automatically changed using techniques such as ballooning. In such situations where memory is shared across VMs, once again performance SLAs such as those described herein can be used since tenants can no longer be assured of resources (and hence performance) for their applications.

Figure 7:
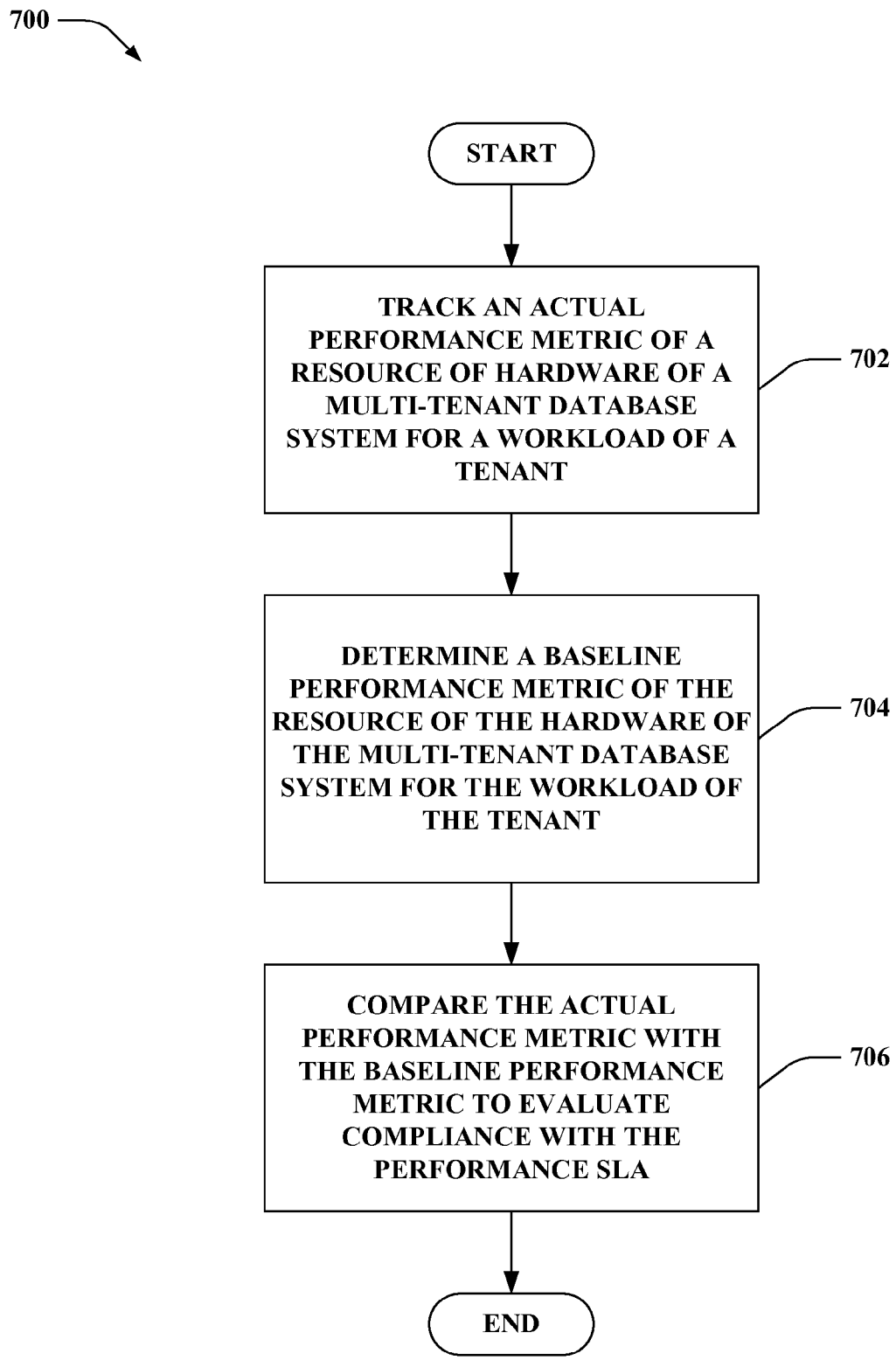
FIG. 7 is a flow diagram that illustrates an exemplary methodology for evaluating service provider compliance with terms of a performance SLA for a tenant in a multi-tenant database system.
Figure 8:
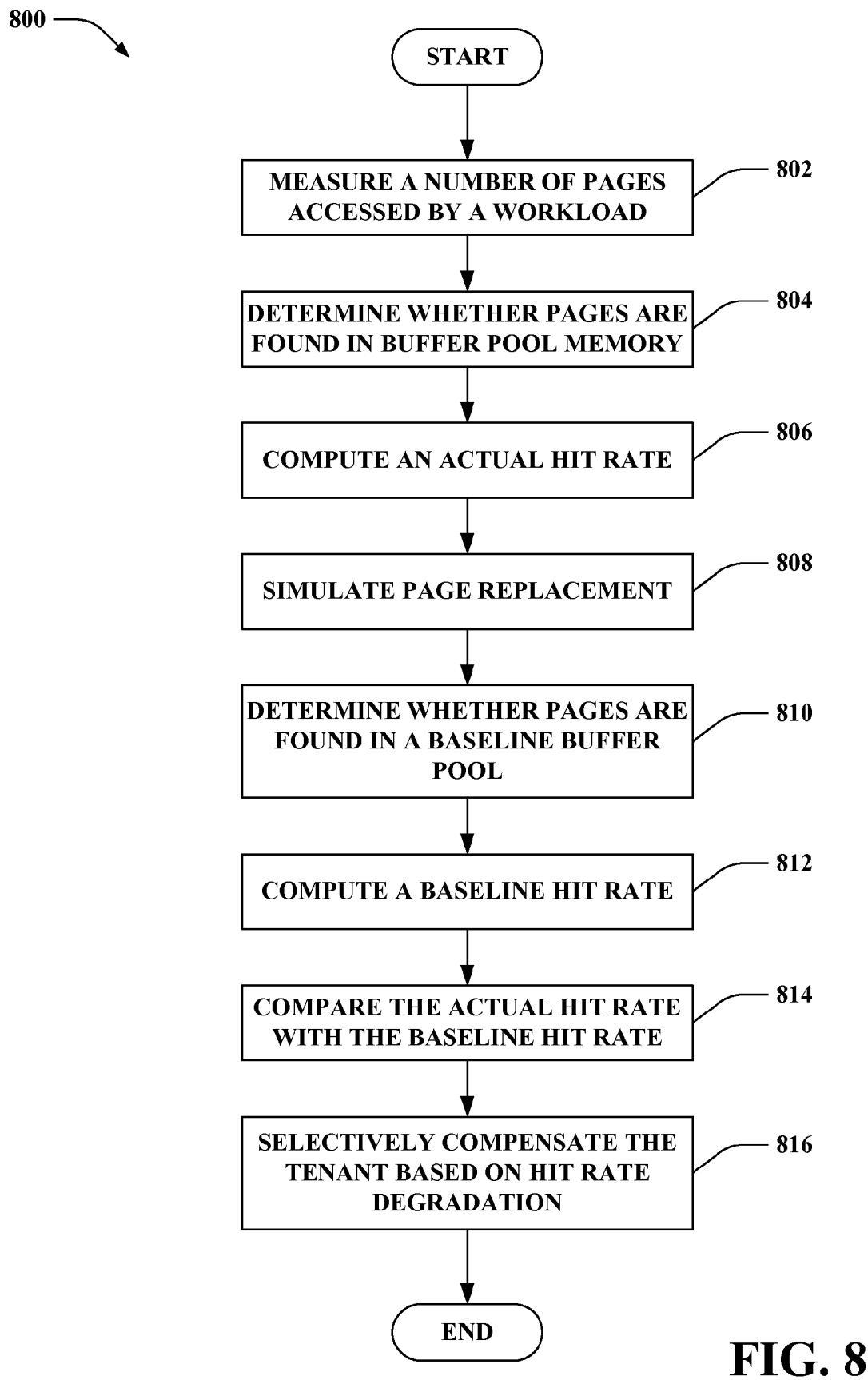
FIG. 8 is a flow diagram that illustrates an exemplary methodology of evaluating and enforcing a performance SLA for buffer pool memory in a multi-tenant database system.

FIGS. 7-8 illustrate exemplary methodologies relating to evaluating compliance with a performance SLA in a multi-tenant database system. While the methodologies are shown and described as being a series of acts that are performed in a sequence, it is to be understood and appreciated that the methodologies are not limited by the order of the sequence.

For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of evaluating service provider compliance with terms of a performance SLA for a tenant in a multi-tenant database system. The terms of the performance SLA can set a performance criterion as though a level of a resource of hardware of the multi-tenant database system is dedicated for the tenant. At 702, an actual performance metric of the resource of the hardware of the multi-tenant database system can be tracked for a workload of the tenant. At 704, a baseline performance metric of the resource of the hardware of the multi-tenant database system can be determined for the workload of the tenant. For instance, the baseline performance metric can be based on a simulation as though the level of the resource of the hardware of the multi-tenant database system as set in the performance SLA is dedicated to the workload of the tenant. At 706, the actual performance metric can be compared with the baseline performance metric to evaluate compliance with the performance SLA.

Now turning to FIG. 8, illustrated is a methodology 800 of evaluating and enforcing a performance SLA for buffer pool memory in a multi-tenant database system. At 802, a number of pages accessed by a workload of a tenant in a multi-tenant database system can be measured. At 804, for each of the pages accessed by the workload of the tenant, whether the page is found in buffer pool memory of the multi-tenant database system can be determined. At 806, an actual hit rate can be computed as a fraction of the pages accessed by the workload of the tenant that are found in the buffer pool memory.

At 808, page replacement that would have been carried out for the workload of the tenant can be simulated given an amount of buffer pool memory specified in a performance SLA being dedicated to the tenant. For example, the page replacement can be simulated in a baseline buffer pool based on a page replacement policy. At 810, for each of the pages accessed by the workload of the tenant, whether the page is found in the baseline buffer pool can be determined. At 812, a baseline hit rate can be computed as a fraction of the pages accessed by the workload of the tenant that are found in the baseline buffer pool. At 814, the actual hit rate can be compared with the baseline hit rate to evaluate a hit rate degradation. At 816, the tenant can be selectively compensated based on the hit rate degradation. For instance, an amount of compensation can be determined based on the hit rate degradation using a penalty function specified in the performance SLA.

Figure 9:
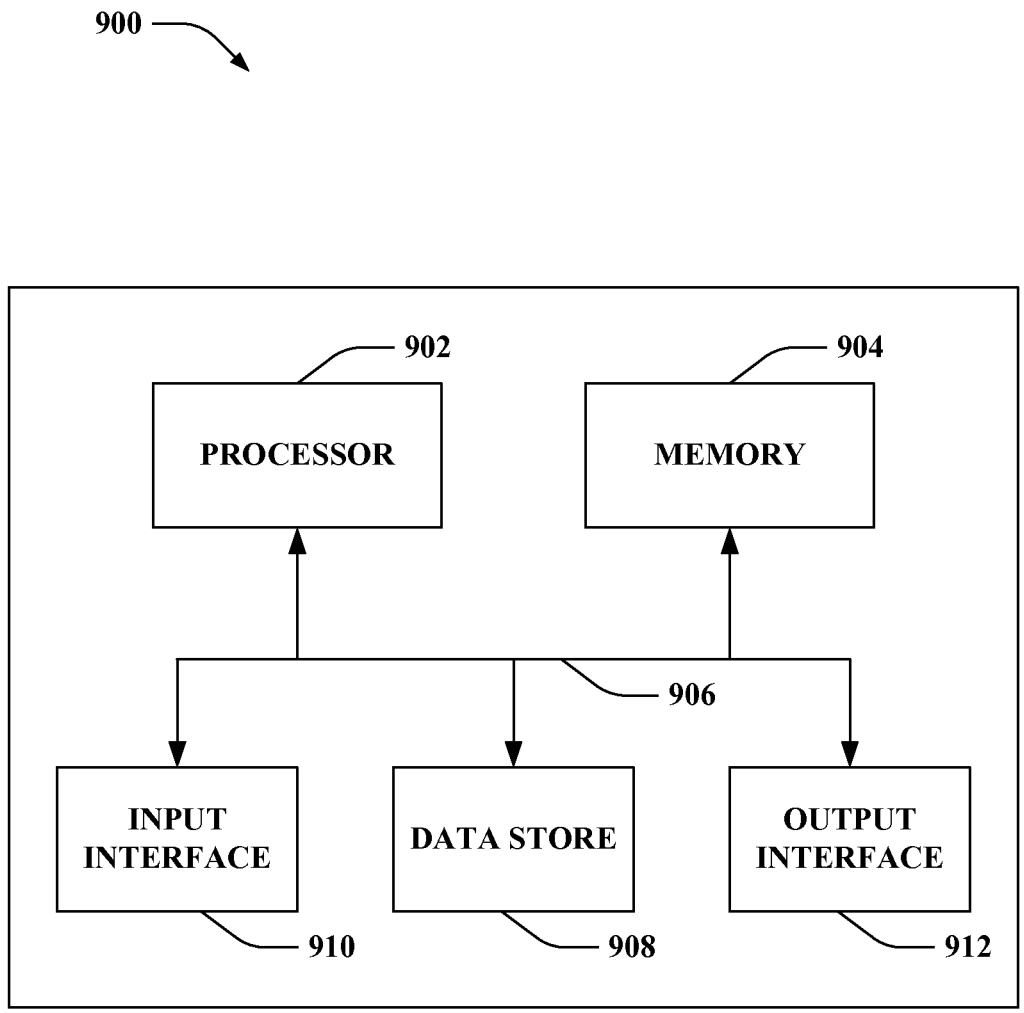
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that evaluates compliance with performance SLAs. By way of another example, the computing device 900 can be used in a system that allocates resource(s) based at least in part upon performance SLAs. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store performance SLAs, pages from tenant databases, baseline buffer pools for tenants, and so forth.

The computing device 900 additionally includes a data store 908 that is accessible by the processor 902 by way of the system bus 906. The data store 908 may include executable instructions, performance SLAs, tenant databases, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave

What is claimed is:

1. A method of managing a multi-tenant database system, comprising:
   tracking an actual performance metric of a resource of hardware of the multi-tenant database system for a workload of a tenant, the resource of the hardware of the multi-tenant database system being shared with at least one disparate workload of at least one disparate tenant, the multi-tenant database system having a performance service level agreement (SLA) for the tenant, terms of the performance SLA set a performance criterion as though a level of the resource of the hardware of the multi-tenant database system is dedicated for the tenant;
   simulating utilization of a dedicated resource of hardware, the utilization of the dedicated resource of the hardware simulated based on:
   the workload of the tenant; and
   the level of the resource of the hardware of the multi-tenant database system set in the performance SLA as being dedicated to the workload of the tenant;
   determining a baseline performance metric of the resource of the hardware of the multi-tenant database system for the workload of the tenant based on the utilization of the dedicated resource of the hardware as simulated;
   comparing the actual performance metric with the baseline performance metric to evaluate a performance degradation ( ); and
   allocating the resource of the hardware of the multi-tenant database system to the workload of the tenant based on the performance degradation.

2. The method of claim 1, the resource of the hardware of the multi-tenant database system further being allocated to the workload of the tenant based on a penalty function that penalizes the performance degradation, wherein the penalty function is specified by the performance SLA.

3. The method of claim 1, further comprising:
   metering compliance with the performance SLA independently during different time intervals, wherein a predefined duration is set for the different time intervals by the performance SLA; and
   selectively compensating the tenant for each of the different time intervals based on the independently metered compliance with the performance SLA.

4. The method of claim 1, wherein the level of the resource of the hardware of the multi-tenant database system specified in the performance SLA is at least one of a number of IOs per second or a latency for IOs.

5. The method of claim 1, wherein the level of the resource of the hardware of the multi-tenant database system specified in the performance SLA is an amount of CPU utilization.

6. The method of claim 1, wherein the level of the resource of the hardware of the multi-tenant database system specified in the performance SLA is an amount of working memory.

7. The method of claim 1, wherein the level of the resource of the hardware of the multi-tenant database system specified in the performance SLA is an amount of buffer pool memory.

8. The method of claim 7, wherein the actual performance metric of the buffer pool memory is an actual hit rate of the buffer pool memory, and the baseline performance metric of the buffer pool memory is a baseline hit rate of the buffer pool memory, and the performance degradation is a hit rate degradation; and
   allocating the resource of the hardware of the multi-tenant database system to the workload of the tenant based on the performance degradation further comprising:
   evicting a selected page from the buffer pool memory of the multi-tenant database system based on the hit rate degradation.

9. The method of claim 8, further comprising:
   measuring a number of pages accessed by the workload of the tenant;
   for each of the pages accessed by the workload of the tenant, determining whether the page is found in the buffer pool memory; and
   computing the actual hit rate as a fraction of the pages accessed by the workload of the tenant that are found in the buffer pool memory.

10. The method of claim 8, further comprising:
    simulating page replacement that would have been carried out for the workload of the tenant given the amount of the buffer pool memory being dedicated to the tenant, wherein the page replacement is simulated in a baseline buffer pool based on a page replacement policy;
    measuring a number of pages accessed by the workload of the tenant;
    for each of the pages accessed by the workload of the tenant, determining whether the page is found in the baseline buffer pool; and
    computing the baseline hit rate as a fraction of the pages accessed by the workload of the tenant that are found in the baseline buffer pool.

11. The method of claim 10, wherein the baseline buffer pool comprises page IDs of the pages accessed by the workload of the tenant and lacks contents of the pages accessed by the workload of the tenant.

12. The method of claim 1, wherein the performance SLA for the tenant in the multi-tenant database system specifies an amount of buffer pool memory, a performance metric type, a predefined duration of time for a time interval at which compliance with the performance SLA is metered, pricing information, and a penalty function.

13. The method of claim 1, further comprising allocating the resource of the hardware of the multi-tenant database system between the workload of the tenant and the at least one disparate workload of the at least one disparate tenant based on:
    the performance degradation of the tenant;
    a penalty function specified in the performance SLA for the tenant;
    at least one performance degradation of the at least one disparate tenant; and
    at least one penalty function specified in at least one disparate performance SLA for the at least one disparate tenant.

14. A multi-tenant database system, comprising:
    a resource of hardware;
    at least one processor; and memory that comprises computer-executable instructions that, when executed by the at least one processor, cause the at least one processor to perform acts including:

evaluating, for a workload of a tenant and disparate workloads of disparate tenants, performance degradations between actual performance metrics of the resource of the hardware and baseline performance metrics of the resource of the hardware; and allocating the resource of the hardware between the workload of the tenant and the disparate workloads of the disparate tenants based on the performance degradations for the workload of the tenant and the disparate workloads of the disparate tenants;

wherein a performance service level agreement (SLA) for the tenant and disparate performance SLAs for the disparate tenants comprise terms that set performance criteria as though corresponding levels of the resource of the hardware are respectively dedicated for the tenant and each of the disparate tenants; and wherein the baseline performance metrics of the resource of the hardware for the workload of the tenant and the disparate workloads of the disparate tenants are based on simulations of utilizations of the levels of the resource of the hardware respectively dedicated for the tenant and each of the disparate tenants set in the performance SLA and the disparate performance SLAs for the workload of the tenant and the disparate workloads of the disparate tenants.

15. The multi-tenant database system of claim 14, wherein the resource of the hardware is buffer pool memory, and the memory further comprising computer-executable instructions that, when executed by the at least one processor, cause the at least one processor to perform acts including:

selecting a page eviction from the buffer pool memory based on the performance degradation for the workload of the tenant and the disparate workloads of the disparate tenants.

16. The multi-tenant database system of claim 15, the memory further comprising computer-executable instructions that, when executed by the at least one processor, cause the at least one processor to perform acts including:

selecting a page for eviction from the buffer pool memory further based on a penalty function specified in the performance SLA for the tenant and disparate penalty functions specified in the disparate performance SLAs for the disparate tenants.

17. The multi-tenant database system of claim 16, the memory further comprising computer-executable instructions that, when executed by the at least one processor, cause the at least one processor to perform acts including:

determining an expected penalty incurred if the page is evicted from the buffer pool memory based upon an estimation of a hit rate degradation, wherein the page is selected for eviction based on the expected penalty.

18. The multi-tenant database system of claim 16, the memory further comprising computer-executable instructions that, when executed by the at least one processor, cause the at least one processor to perform acts including:

selecting the page for eviction from the buffer pool memory based on a likelihood of the page being accessed by one of: the workload of the tenant or one of the workloads of the disparate tenants.

19. The multi-tenant database system of claim 14, the memory further comprising computer-executable instructions that, when executed by the at least one processor, cause the at least one processor to perform acts including:

evaluating service provider compliance with the terms of the performance SLA for the tenant and the disparate performance SLAs for the disparate tenants.

20. A computer-readable storage medium including computer-executable instructions that, when executed by a processor, cause the processor to perform acts including:

measuring a number of pages accessed by a workload of a tenant in a multi-tenant database system;

for each of the pages accessed by the workload of the tenant, determining whether the page is found in buffer pool memory of the multi-tenant database system, the buffer pool memory of the multi-tenant database system being shared with a concurrently executing workload of a disparate tenant;

computing an actual hit rate as a fraction of the pages accessed by the workload of the tenant that are found in the buffer pool memory;

simulating page replacement that would have been carried out for the workload of the tenant in dedicated buffer pool memory, the page replacement simulated based on the workload of the tenant and an amount of the dedicated buffer pool memory specified in a performance service level agreement (SLA) as being dedicated to the tenant, wherein the page replacement is simulated in a baseline buffer pool based on a page replacement policy;

for each of the pages accessed by the workload of the tenant, determining whether the page is found in the baseline buffer pool;

computing a baseline hit rate as a fraction of the pages accessed by the workload of the tenant that are found in the baseline buffer pool;

comparing the actual hit rate with the baseline hit rate to evaluate a hit rate degradation; and evicting a selected page from the buffer pool memory of the multi-tenant database system based on the hit rate degradation and a penalty function specified in the performance SLA.

* * * * *